(No Model.)
O. E. SHORT.
SPRING VEHICLE.
No. 339,223. Patented Apr. 6, 1886.
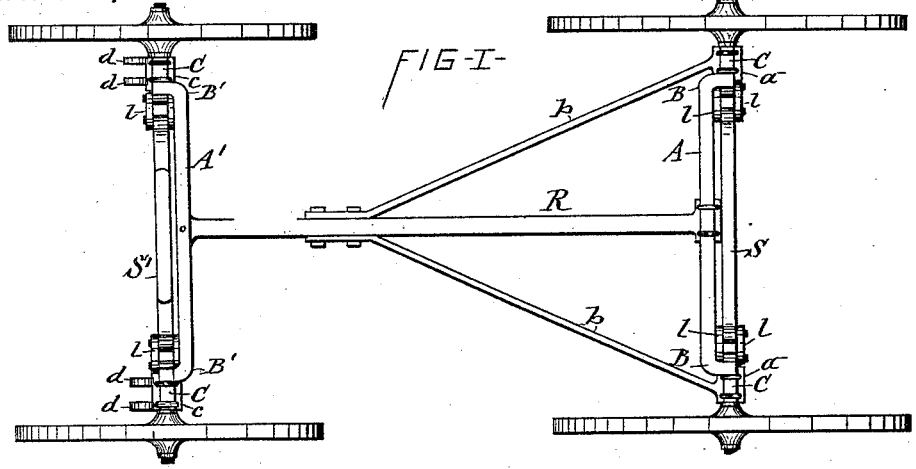
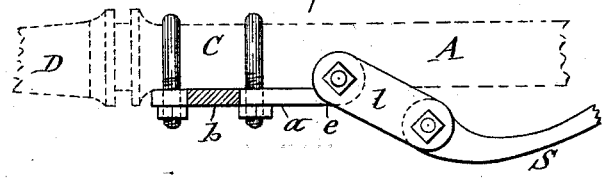
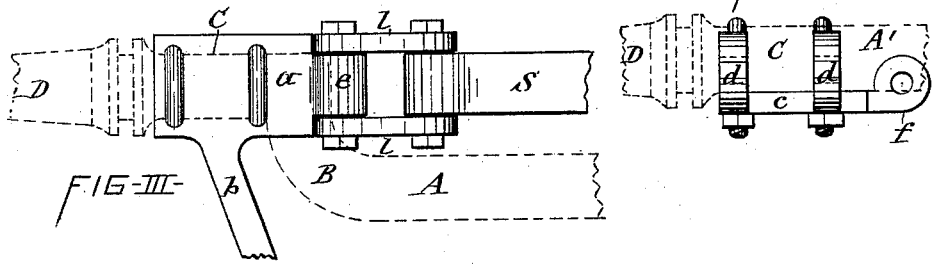
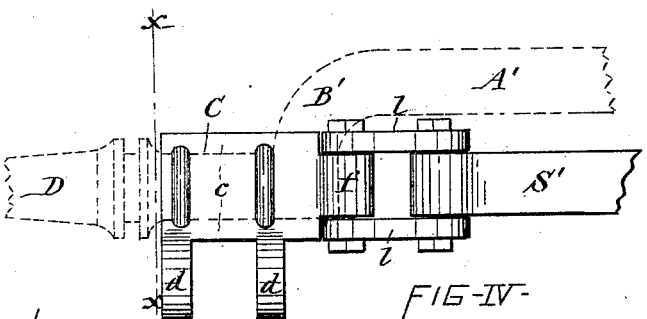
WITNESSES:
C. Bendixon
F. H. Gibbs
INVENTOR:
Orville E. Short
per Shull, Lacas & Hoy
Attys

UNITED STATES PATENT OFFICE.

ORVILLE E. SHORT, OF SYRACUSE, NEW YORK.

SPRING-VEHICLE.

SPECIFICATION forming part of Letters Patent No. 339,223, dated April 6, 1886.

Application filed July 31, 1885. Serial No. 173,134. (No model.)

*To all whom it may concern:*

Be it known that I, ORVILLE E. SHORT, of Syracuse, in the county of Onondaga, in the State of New York, have invented new and useful Improvements in Spring-Vehicles, of which the following, taken in connection with the accompanying drawings, is a full, clear, and exact description.

This invention relates to the class of spring-vehicles which have the central or main portion of the axle deflected horizontally, and the cross-spring hung on the end portions of the axle and carried in range with said end portions.

My invention consists in improved means for connecting the cross-spring with the aforesaid horizontally-deflected axle, and is designed to effect said connection in a simpler and yet more effective and secure manner.

In the annexed drawings, Figure I is a plan view of the running-gear of a vehicle provided with my improved spring attachments. Figs. II and III are enlarged front and top plan views, respectively, of the spring attachment at one end of the hind axle. Fig. IV is a top plan view of the spring attachment at one end of the forward axle. Fig. V is a front view of the same; and Fig. VI is a transverse section on line *x x*, Fig. IV.

Similar letters of reference indicate corresponding parts.

A and A' denote, respectively, the hind and forward axles of the vehicle. These axles I form with horizontal offsets B B' a short distance from the spindles D, leaving straight portions C C adjacent to the spindles. By the aforesid offsets the main central portion of the axle is deflected horizontally out of range with the spindles of the axle. On the straight portions C C of the hind axle, A, I fasten clip-bars *a a*, each of which is formed integral with one of the reach-braces *b*, projecting from the front thereof, and with an ear, *e*, projecting from the said clip-bar toward the opposite end of the axle and in range with the spindles, and on said ear *e* is hung the end of the cross-spring S, by means of links *l l*, coupled to the ear *e* and to an eye on the end of the spring, in the usual and well-known manner.

The horizontal deflection of the axle carries the same out of the way of the spring, so as to allow the latter free vertical play. Said deflection I make forward from the straight portions C C of the hind axle for the purpose of shortening the reach R, which is connected to the central portion of the axle. The deflection of the forward axle, A', I make rearward for the same purpose, and to the straight end portions C C thereof I attach clip-bars *c c*, which have each formed integral with them the forward-projecting ears *d d*, for the attachment of the thills, and an ear, *f*, projecting from the clip-bar toward the opposite end of the axle and in range with the spindles, the cross-spring S' being connected to the ear *f* by the usual links, *l l*, in the same manner as the spring S at the rear end of the vehicle, and being afforded the same free vertical play by the horizontal deflection of the axle.

Having described my invention, what I claim as new and desire to secure by Letters Patent, is—

1. In combination with the axle A, formed with the horizontal offsets B B and straight end portions C C, the clip-bars *a a*, fastened on the axle portions C C, and formed integral with the reach-braces *b b* and with the ears *e*, projecting from the clip-bars in range with the axle-spindles, and the spring S, hung on said ears, substantially as described and shown.

2. The combination of the forward axle, A', formed with the horizontal offsets B' B' and with the straight portions C C, adjacent to and in line with the spindles, the clip-bars *c c*, fastened to the axle portions C C, and formed integral with the ears *d d*, projecting from the front of the clip-bars, and with the ears *f*, projecting from the clips-bars and in range with the spindles, links *l l*, coupled to the ears *f*, and the spring S', hung on said links and standing in range with the axle-spindles, substantially as described and shown.

In testimony whereof I have hereunto signed my name and affixed my seal, in the presence of two attesting witnesses, at Syracuse, in the county of Onondaga, in the State of New York, this 29th day of July, 1885.

ORVILLE E. SHORT. [L. S.]

Witnesses:
F. H. GIBBS,
C. BENDIXON.